United States Patent [19]
Honjo

[11] Patent Number: 4,734,758
[45] Date of Patent: Mar. 29, 1988

[54] SIGNAL PROCESSING CIRCUIT

[75] Inventor: Masahiro Honjo, Neyagawa, Japan

[73] Assignee: Matsushita Electric Industrial Co., Ltd., Osaka, Japan

[21] Appl. No.: 854,746

[22] Filed: Apr. 22, 1986

[30] Foreign Application Priority Data

Apr. 25, 1985 [JP] Japan .................................. 60-89218
Dec. 10, 1985 [JP] Japan ................................ 60-277103
Dec. 10, 1985 [JP] Japan ................................ 60-277104

[51] Int. Cl.⁴ ............................................. H04N 9/78
[52] U.S. Cl. ......................................... 358/31; 358/36
[58] Field of Search ..................................... 358/31, 36

[56] References Cited

U.S. PATENT DOCUMENTS 4,178,609 12/1979 Beutel ..................................... 358/31
4,263,612 4/1981 Gibson et al. .......................... 358/31

FOREIGN PATENT DOCUMENTS 56-40382 4/1981 Japan .
117887 7/1984 Japan ..................................... 358/36

Primary Examiner—John W. Shepperd
Attorney, Agent, or Firm—Wenderoth, Lind & Ponack

[57] ABSTRACT

A signal processing circuit for certainly detecting presence or absence of a change in the vertical direction of amplitude and phase of a chrominance signal by once converting the change in the vertical direction of amplitude and phase of the input chrominance signal into a change in the direction of amplitude by a converter, then comparing the converted output with a signal obtained by passing the converted output through one or a plurality of delay circuits by one or a plurality of comparing circuits in amplitude level, and then making an operation with the output of the comparing circuit by an operational circuit.

14 Claims, 15 Drawing Figures

SIGNAL PROCESSING CIRCUIT

BACKGROUND OF THE INVENTION

1. Field of the Invention

The present invention relates to a video signal processing circuit for use in a video tape recorder (VTR), television set, and the like.

2. Description of the Prior Art

Recently comb filters have become widely used in signal processing circuits treating video signals.

In the case of the NTSC signal, for example, the spectra of the chrominance signal (hereinafter to be briefly called C signal) are interleaved between those of the luminance signal at intervals of the horizontal scanning period (the period to be briefly called 1 H). The luminance signal (to be briefly called Y signal) is separated from the input video signal by a Y type comb filter which adds a 1 H delayed video signal to the input video signal, and the chrominance signal is separated from the input video signal by a C type comb filter which subtracts the 1 H delayed video signal from the input video signal. Thus, the comb filters are used in the so-called Y/C separating circuit. The C type comb filter is used also in the color S/N improving circuit for the VTR.

These comb filters, however, function on condition that the vertical correlation of the chrominance signal is large. During the period in which the vertical correlation is small, the Y/C separation does not function well and such bad results are thereby produced as color fringing and dot interference. There have been proposed various methods for detecting presence or absence of the vertical correlation of the chrominance signal. One method detects the vertical correlation of the Y signal utilizing the fact that the correlation between the Y signal and the C signal is large, but this causes malfunction with a signal in which there is no correlation between the Y signal and the C signal.

Another method is proposed by Yves C. Faroudja in Japanese Laid-open patent application No. 56-40382 for detecting the correlation when the signal level of the chrominance signal frequency component and the signal level of the luminance signal frequency component are both larger than a predetermined level. A simplified block diagram of this prior art method is shown in FIG. 13. According to this construction, when a chrominance signal as shown by a in FIG. 14 is inputted, a signal b as a detected output by the C type comb filter and a signal c as a detected output by the Y type comb filter are passed through an AND gate 81, and a signal as indicated by d is thereby outputted.

When a signal which includes a difference only in the phase as shown by a in FIG. 15 is inputted, however, a signal as indicated by d will be outputted even if the signals b and c are passed through the AND gate, so that the correlation of the chrominance signal will not be detected (this is a disadvantage with this method). In other words, with the arrangement as described above, it is impossible to detect the absence of the vertical correlation of the chrominance signal from a signal which includes neither correlation between the C signal and the Y signal nor change of amplitude in the vertical direction of the chrominance signal but only includes a change of hue. Therefore, it is unavoidable that the trouble like color fringing or dot interference is produced.

SUMMARY OF THE INVENTION

An object of the present invention is to provide a signal processing circuit which is capable of accurately detecting the vertical correlation of the chrominance signal.

The signal processing circuit of the invention detects the absence of vertical correlation of the chrominance signal by comparing a vertical correlation of amplitude level and that of phase of the chrominance signal. The signal processing circuit of the present invention comprises a converter for converting a change in the vertical direction of each of amplitude and phase of an input chrominance signal into a change in the direction of amplitude, and a comparing circuit for comparing the amplitude level of a delayed signal by a predetermined time period of the output of the converter with the amplitude level of the output of the converter, whereby the vertical correlation of the input chrominance signal is detected.

The present invention with the above described structure makes it possible that a change in the vertical direction of each of amplitude level and phase of a chrominance signal is detected, and thereby, presence and absence of vertical correlation of the chrominance signal is certainly detected.

DESCRIPTION OF THE PREFERRED EMBODIMENTS

Signal processing circuits of preferred embodiments of the present invention will be described in the following with reference to the accompanying drawings.

Figure 1:
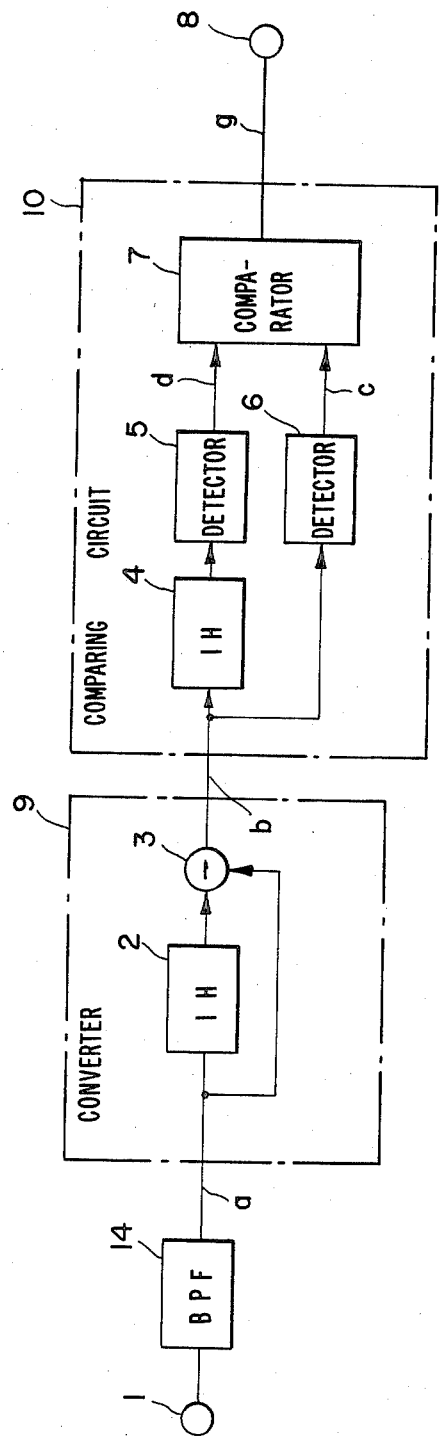
FIG. 1 is a block diagram showing a signal processing circuit according to a first embodiment of the invention.

FIG. 1 is a block diagram of a first preferred embodiment of the invention. A composite signal input to an input terminal 1 is passed through a band pass filter (BPF) 14 and sent to a converter 9 consisting of a 1 H delay circuit 2 and a subtractor 3, where a change of phase in the vertical direction of the chrominance signal is converted into a change of amplitude. The chrominance signal is then sent to a comparing circuit 10, that is, the same is, on one hand, sent to a detector 5 via a 1 H delay circuit 4, and, on the other hand, sent to a detector 6.

Outputs of the detectors 5 and 6 are compared by a comparator 7 and when the level difference is large enough, a signal of High level, for example, is output from an output terminal 8.

Figure 2:
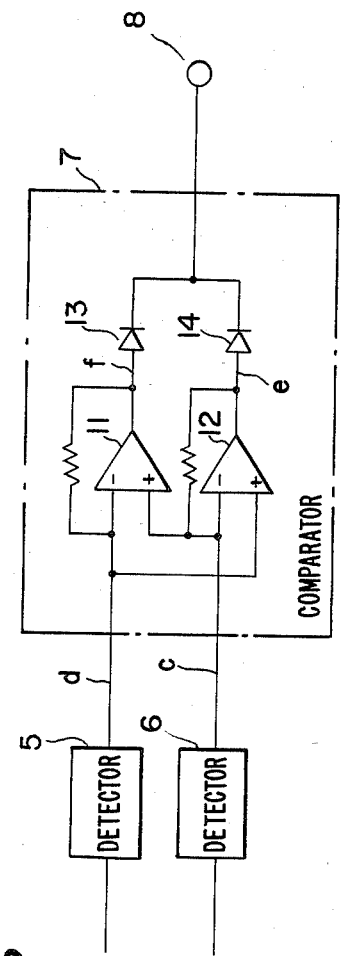
FIG. 2 is a block diagram showing main portion of the same.

An example of the comparator 7 is shown in FIG. 2.

The output of the detector 5 is connected to a negative input of a comparator 11 and a positive input of a comparator 12, and the output of the detector 6 is connected to a positive input of the comparator 11 and a negative input of the comparator 12. Outputs of the comparators 11, 12 are subjected to an OR operation for the high level by diodes 13 and 14 and sent to the output terminal 8. Operations of various parts of the present invention as constructed above will be described below referring to the waveform diagrams of FIGS. 3 and 4.

Figure 3:
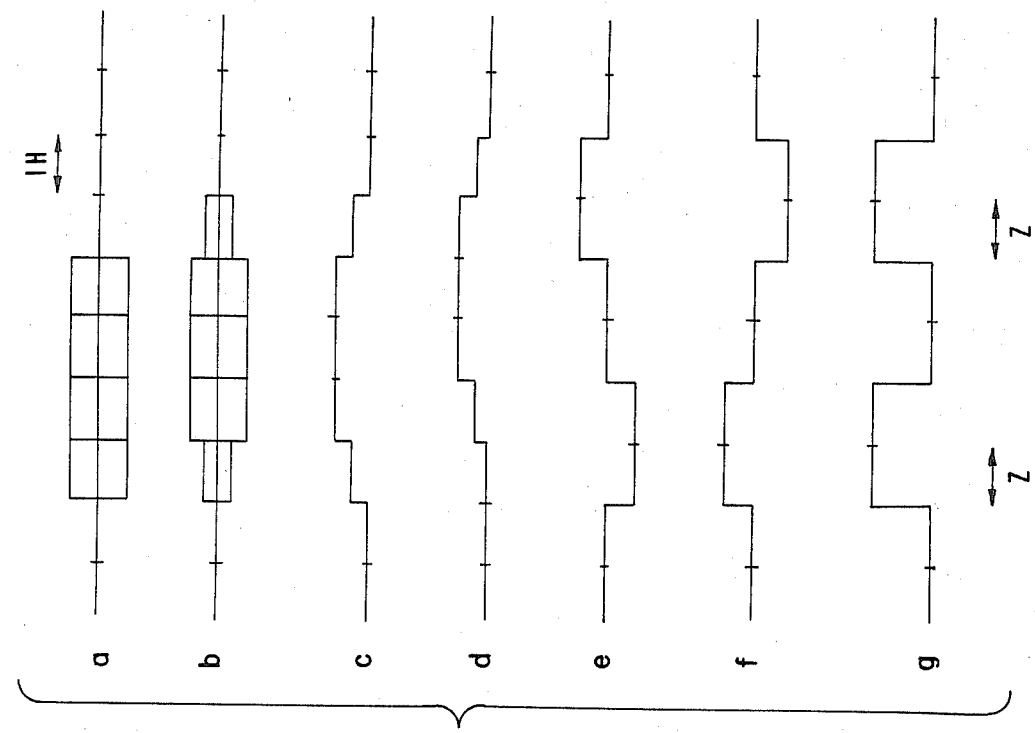
FIGS. 3 and 4 are waveform diagrams showing signal waveforms at various portions in FIGS. 1 and 2, respectively.

First the case where amplitude of the chrominance signal changes in the vertical direction is indicated in FIG. 3, in which the diagrams a to g indicate the waveforms corresponding to the portions a–g in FIGS. 1 and 2.

The input signal a is converted into a chrominance signal b by means of a comb filter, then detected and made into signals c and d by the detectors 5, 6, and the same are then turned into signals e, f in the comparator 7 and output as a signal g through an OR operation thereby. Here, it is found that the signal g includes the period z during which there is no vertical correlation of the chrominance signal.

Figure 4:
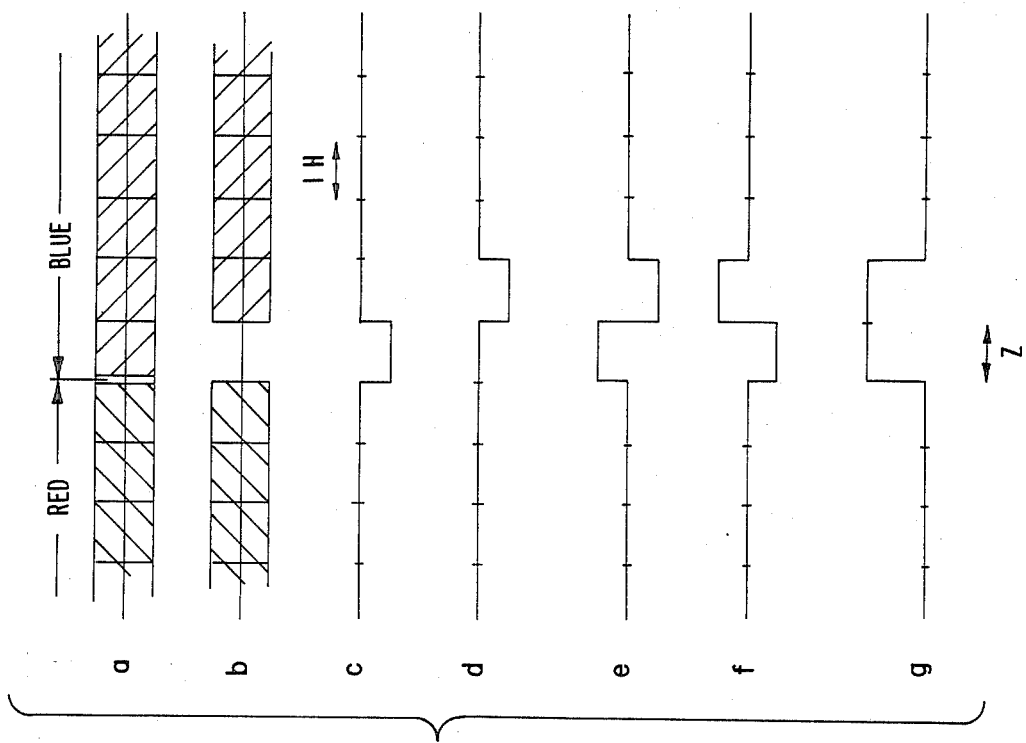

Then, the case where hue changes in the vertical direction is indicated in FIG. 4.

The input signal a is converted into a chrominance signal b by means of the comb filter, then detected and made into signals c and d by the detectors 5, 6, and the same are then turned into signals e, f in the comparator 7 and output as a signal g. Here, it is found that the signal g includes the period z during which there is no vertical correlation of hue, which has never been detected by a prior art device. That is, two sets of 1 H delay circuits 2 and 4 been used in this case as shown in FIG. 1 and the change of hue in the vertical direction has been converted into the change of color in the direction of amplitude by the converter constituted of the first 1 H delay circuit, whereby the detection of the change of hue in the vertical direction which was unachievable by a prior art device has been made possible.

The band pass filter 14 in the present case may be disposed in the succeeding stage to the subtractor 3, may be disposed in the preceding stage to the detectors 5, 6, or may be eliminated.

A signal processing circuit of a second preferred embodiments of the present invention will be described in the following with reference to the accompanying drawings.

Figure 5:
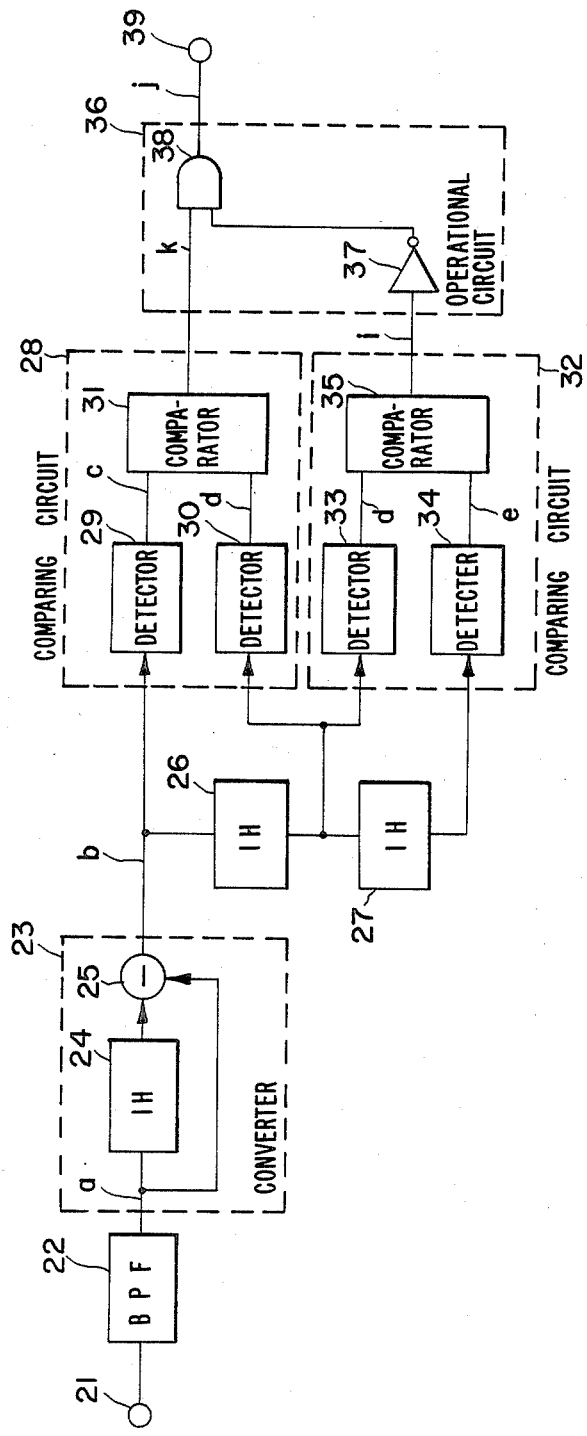
FIG. 5 is a block diagram showing a signal processing circuit according to a second embodiment of the invention.

FIG. 5 is a block diagram of the second preferred embodiments of the invention. A chrominance signal input to an input terminal 21 is passed through a band pass filter 22 and sent to a converter 23 consisting of a 1 H delay circuit 24 and a combining circuit, or, a subtractor 25, where a change of phase in the vertical direction of the chrominance signal is converted into a change of amplitude. The chrominance signal is sent to a delay circuit 26 and to a comparing circuit 28, the output of the delay circuit 26 is sent to a delay circuit 27 and to the comparing circuits 28 and 32, and the output of the delay circuit 27 is sent to the comparing circuit 32. In the comparing circuit 28, the input signals are detected by detectors 29, 30 and the detected signals are compared by a comparator 31, and if the level difference is large enough, a signal of High level is output to an operational circuit 36. Similar operations are made in the comparing circuit 32, also. The operational circuit 36 is constituted of an inverter circuit 37 and an AND circuit 38, for example, and operates such that, if the output of the comparing circuit 28 is "1" and the output of the comparing circuit 32 is "0", the same delivers an output of "1". As a matter of course, this polarity may be opposite if the circuits in the succeeding stages are arranged accordingly.

Figure 6:
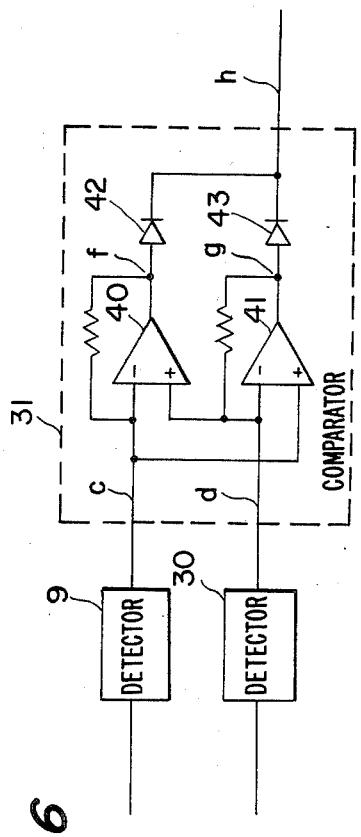
FIG. 6 is a block diagram showing main portion of the same.

While an example of the comparators 31, 35 is shown in FIG. 6, it is the same as the example that was shown in FIG. 2.

Operations in various portions of the invention as structured above will be described in the following with reference to waveform diagrams of FIGS. 7 and 8.

Figure 7:
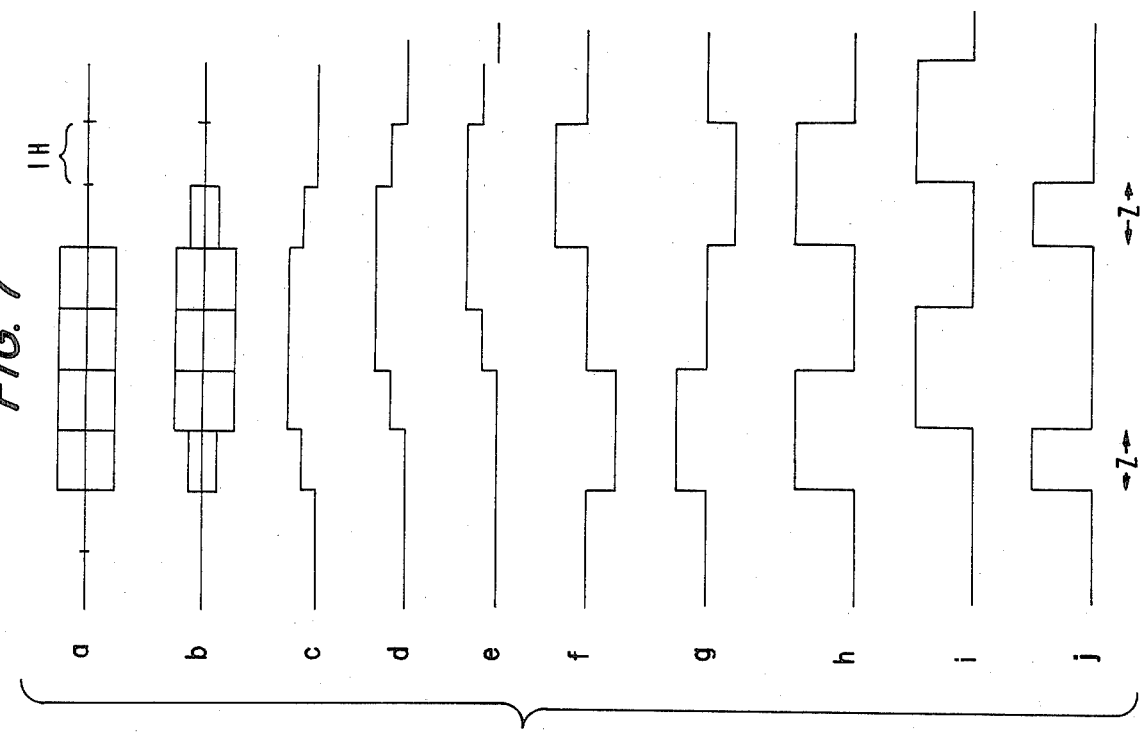
FIGS. 7 and 8 are waveform diagrams showing signal waveforms at various portions in FIGS. 5 and 6, respectively.

First the case where amplitude of the chrominance signal changes in the vertical direction is indicated in FIG. 7, in which the diagrams a–j indicate the waveforms corresponding to the portions a–j in FIGS. 5 and 6.

The input signal a is converted into a chrominance signal b by means of a comb filter, then detected and made into signals c and d by the detectors 29, 30, and the same are then turned into signals f, g in the comparator 31 and output as a signal h through an OR operation thereby. In the same way, signals d, e are provided through detection by detectors 33, 34 and the same are output from the comparator 35 as a signal i. And, through an operaiton with the signals h and i by the operational circuit 36, a signal j is output. Here, it is found that the signal j indicates the period z during which there is no vertical correlation of the chrominance signal.

Figure 8:
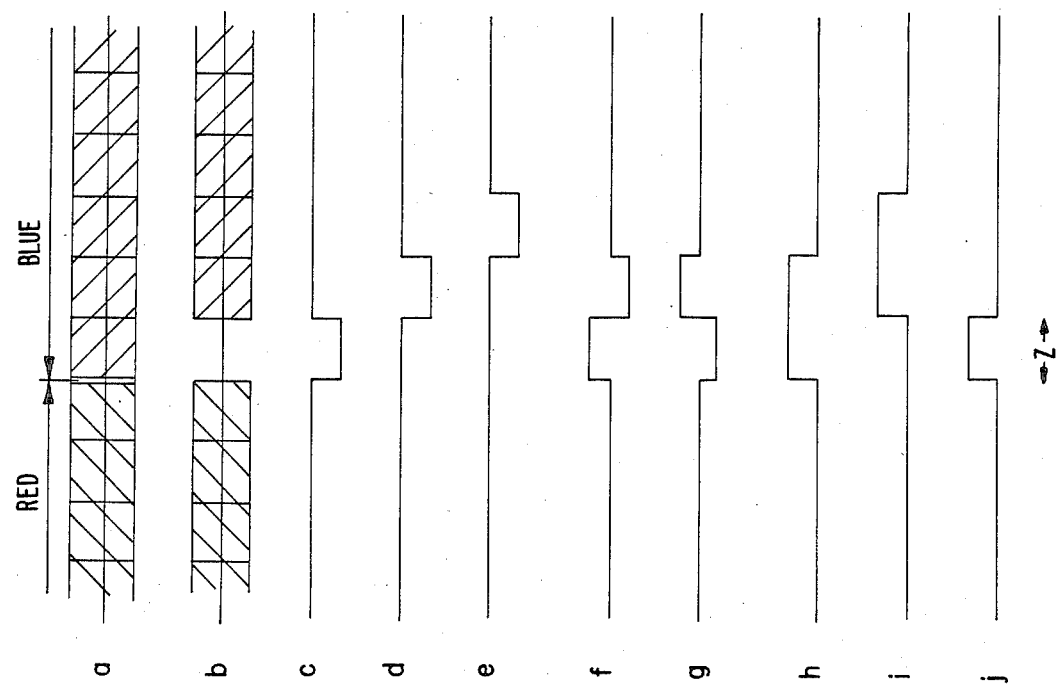

Then, the case where hue changes in the vertical direction is indicated in FIG. 8.

The input signal a is converted into a chrominance signal b by means of the comb filter 23 as a converter, then detected and made into signals c and d by the detectors 29, 30, and the same are then turned into signals f, g in the comparator 31 and output as a signal h. In the same way, after detection by the detectors 33, 34 and comparison by the comparator 35, a signal i is output. And, through an operation in the operational circuit 36 with the signals h and i, a signal j is output. Here, it is found that the signal j indicates the period z during which there is no vertical correlation of hue, which has never been detected by a prior art device. That is, the change of hue in the vertical direction has been converted into the change of color in the direction of amplitude by the converter constituted of the 1 H delay circuit as shown in FIG. 5, whereby the detection of the change of hue in the vertical direction which was unachievable by a prior art device has been made possible.

The band pass filter 22 in the present case may be disposed in the succeeding stage to the subtractor 25, may be disposed in the preceding stage to the detectors 29, 30, 33, 34, or may be eliminated.

Also, since the output signals of the detector 30 and the detector 33 are the same signal, it is possible to eliminate, for example, the detector 33 and adapt the output of the detector 30 to be input to the comparator 35.

When it is desired to apply the present invention to the recording and reproducing systems of a VTR or the like, it is possible to implement the invention by inserting its portion up to the band pass filter 22 and the converter 23 of the embodiment of FIG. 5 into the recording system and inserting the succeeding blocks into the reproducing system. By so doing, an advantage is obtained that the delay circuits can be reduced to two.

A signal processing circuit of a third preferred embodiments of the present invention will be described in the following with reference to the accompanying drawings.

Figure 9:
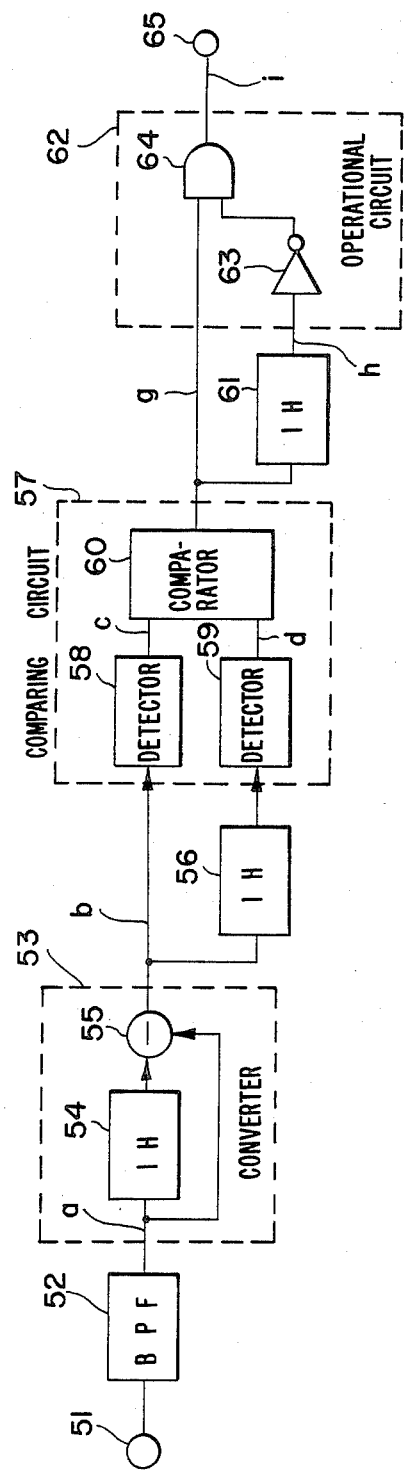
FIG. 9 is a block diagram showing a signal processing circuit according to a third embodiment of the invention.

FIG. 9 is a block diagram of the third preferred embodiment of the invention. A signal input to an input terminal 51 is passed through a band pass filter 52 and sent to a converter 53 consisting of a 1 H delay circuit 54 and a subtractor 55, where a change of phase in the vertical direction of the chrominance signal is converted into a change of amplitude. The chrominance signal is sent to a delay circuit 56 and to a comparing circuit 57, and the output of the delay circuit 56 is sent to a comparing circuit 57. In the comparing circuit 57, the input signal is detected by detectors 58, 59 and the detected outputs are compared by a comparator 60, and if the level difference is large enough, a signal of High level is output to an operational circuit 62 and also to a delay circuit 61. The output from the delay circuit 61 is sent to the operational circuit 62. The operational circuit 62 is constituted of an inverter circuit 63 and an AND circuit 64, for example, and operates such that, if the output of the comparing circuit 57 is "1" and the output of the delay circuit 61 is "0", only then, the same delivers an output of "1". As a matter of course, this polarity may be opposite if the circuits in the succeeding stages are arranged accordingly.

Figure 10:
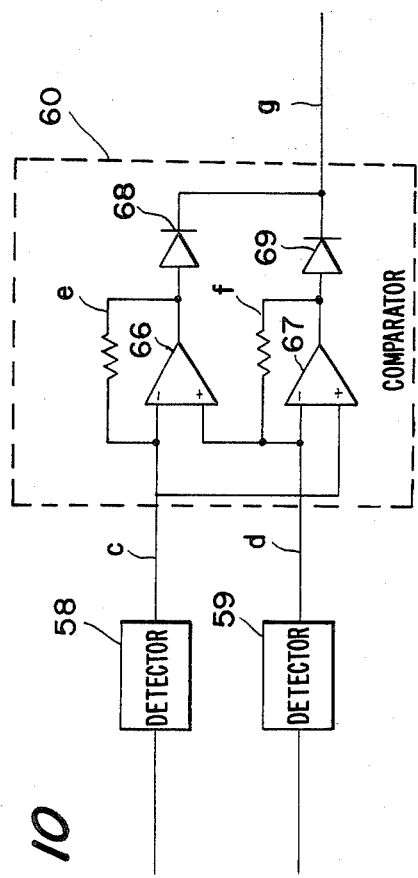
FIG. 10 is a block diagram showing main portion of the same.

While an example of the comparator 60 is shown in FIG. 10, it is the same as the example that was shown in FIG. 2.

Operations in various portions of the invention as structured above will be described in the following with reference to waveform diagrams of FIGS. 11 and 12.

Figure 11:
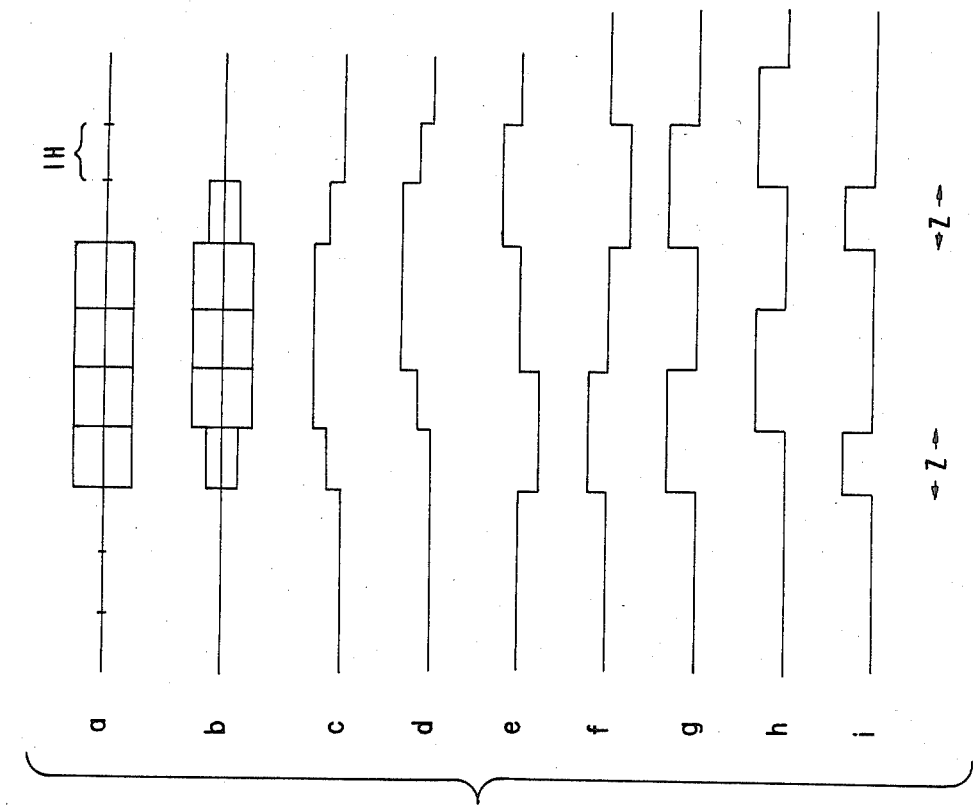
FIGS. 11 and 12 are waveform diagrams showing signal waveforms at various portions in FIGS. 9 and 10, respectively.

First the case where amplitude of the chrominance signal includes a change in the vertical direction is indicated in FIG. 11, in which the diagrams a–j indicate the waveforms corresponding to the portions a–j in FIGS. 9 and 10.

The input signal a is converted into a chrominance signal b by means of a comb filter 53 as a converter, then detected and made into signals c and d by the detectors 58, 59, and the same are then turned into signals e, f in the comparator 60 and output as a signal g through an OR operation thereby to an operational circuit 62. The signal g is also sent to a delay circuit 61 to be delayed by 1 H and sent to the operational circuit 62. And, through an operation with the signals g, h by the operational circuit 62, a signal i is output. Here, it is found that the signal i indicates the period z during which there is no vertical correlation ofthe chrominance signal.

Figure 12:
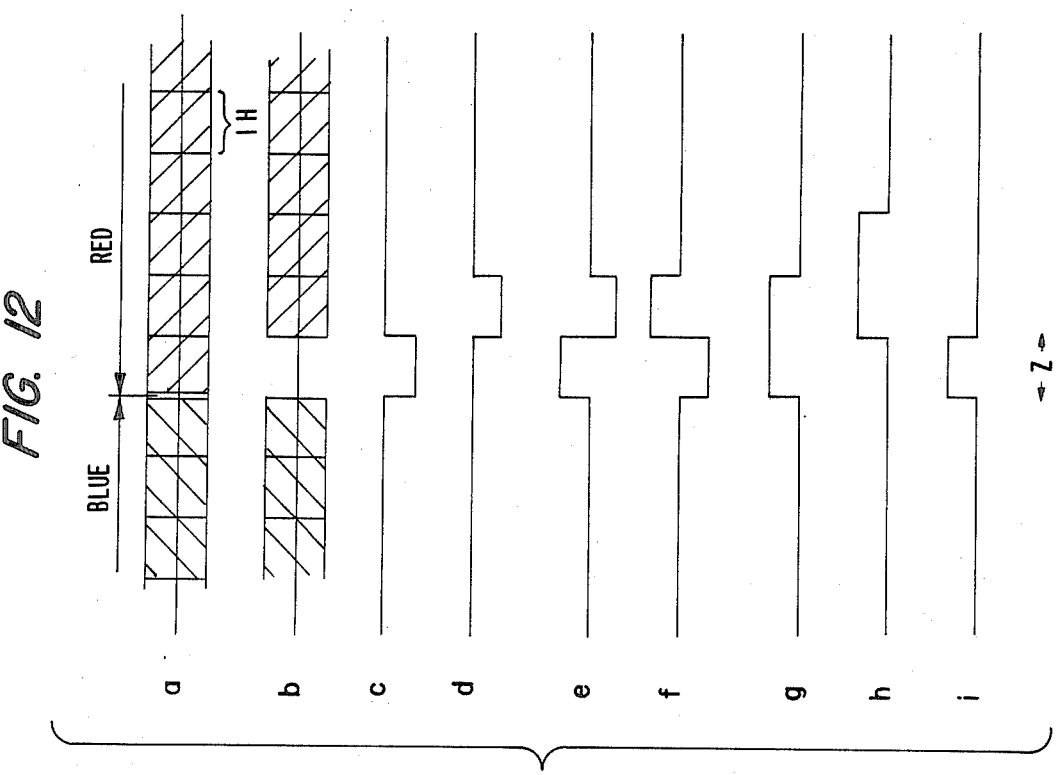
Figure 13:
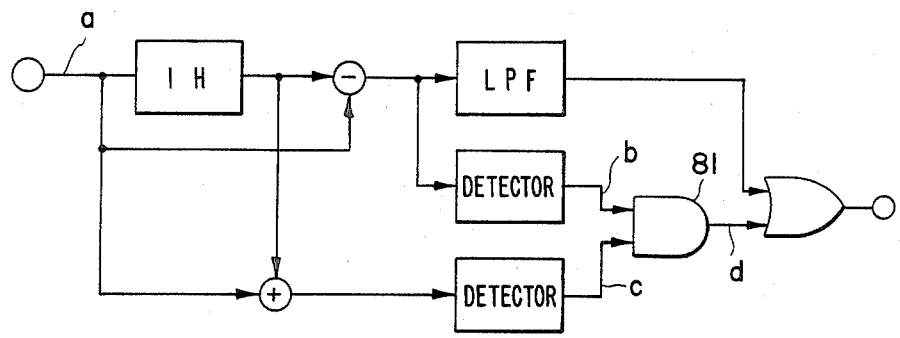
FIG. 13 is a block diagram showing a prior art signal processing circuit.
Figure 14:
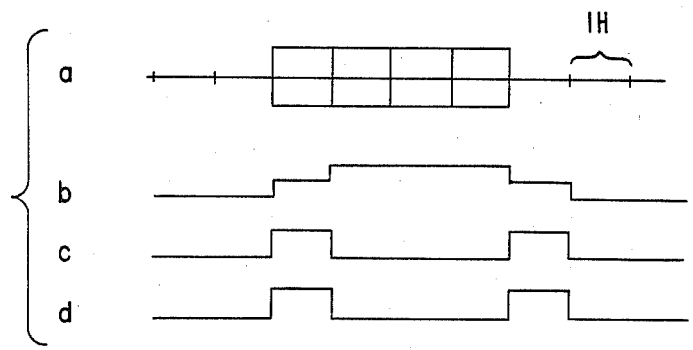
FIGS. 14 and 15 are waveform diagrams for the same.
Figure 15:
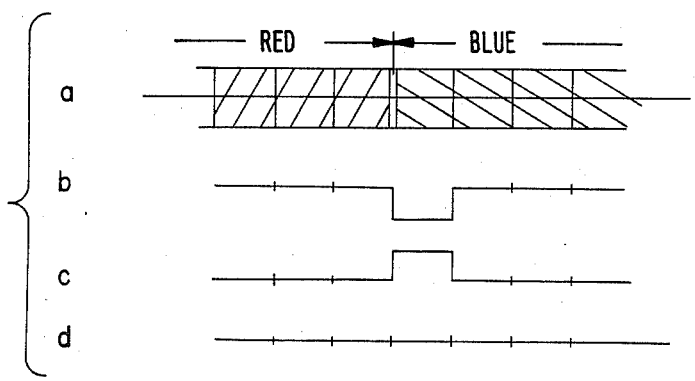
Figure 13:
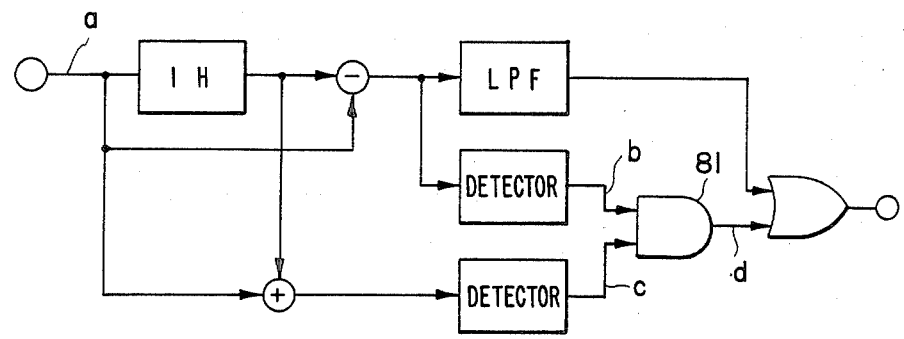
Figure 14:
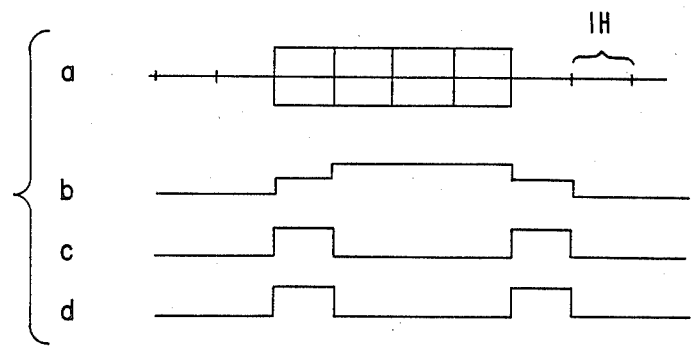
Figure 15:
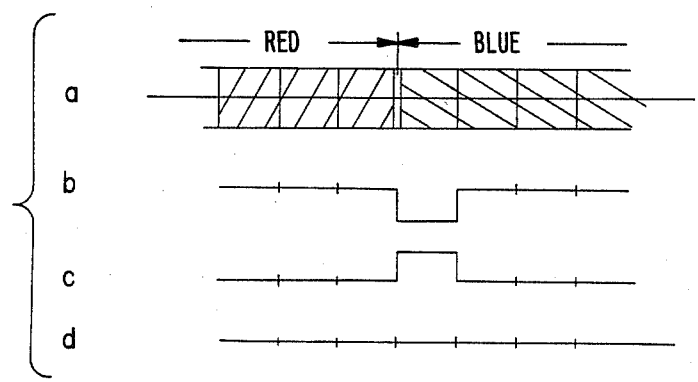

Then, the case where hue is changed in the vertical direction is indicated in FIG. 12.

The input signal a is converted into a chrominance signal b by means of the comb filter 53 as a converter, then detected and made into signals c and d by the detectors 58, 59, and the same are then turned into signals e, f in the comparator 60 and output therefrom as a signal g to the operational circuit 62. Also, the signal g is delayed by 1 H in the delay circuit 61 and delivered to the operational circuit 62 as a signal h. And, through an operation with the signals h and i in the operational circuit 62, a signal i is output. Here, it is found that the signal i indicates the period z during which there is no vertical correlation of hue, which has never been detected by a prior art device. That is, the change of hue in the vertical direction has been converted into the change of color in the direction of amplitude by the converter constituted of the 1 H delay circuit as shown in FIG. 9, whereby the detection of the change of hue in the vertical direction which was unachievable by a prior art device has been made possible.

The band pass filter 52 in the present case may be disposed in the succeeding stage to the subtractor 55, may be disposed in the preceding stage to the detectors 58, 59, or may be eliminated.

When it is desired to apply the present invention to the recording and reproducing systems of a VTR or the like, it is possible to implement the invention by inserting its portion up to the band pass filter 52 and the converter 53 of the embodiment of FIG. 9 into the recording system and inserting the succeeding blocks into the reproducing system. By so doing, an advantage is obtained that the delay circuits can be reduced to two.

When the present invention is applied to the PAL system, some alterations to make the delay to be 2H or so will become necessary.

Also, it is possible within the scope of the present invention to implement this invention in a digital circuitry by replacing the delay circuit with a memory or the like.

What is claimed is:

1. A signal processing circuit comprising:
   a converter for converting a change in the vertical direction of each of amplitude and phase of an input chrominance signal into a change in the direction of amplitude;
   a first delay circuit for delaying the output of said converter by a predetermined time period;
   a second delay circuit for further delaying the output of said first delay circuit by a predetermined time period;
   a first comparing circuit for comparing the amplitude level of the output of said converter with the amplitude level of the output of said first delay circuit;
   a second comparing circuit for comparing the amplitude level of the output of said first delay circuit with the amplitude level of the output of said second delay circuit; and
   an operational circuit for making an operation with the output of said first comparing circuit and the output of said second comparing circuit, whereby a vertical correlation of each the amplitude and phase of the chrominance signal is adapted to be detected.

2. The signal processing circuit according to claim 1, wherein said converter comprises a third delay circuit for delaying the input signal by a predetermined time period and a combining circuit for combining the output of said third delay circuit and said input signal.

3. The signal processing circuit according to claim 1, wherein each said comparing circuit comprises first and second detectors for detecting the input signal, and a comparator for comparing output levels of both said first and second detectors.

4. The signal processing circuit according to claim 1, wherein said operational circuit is adapted to output "1"

only when the output of said first comparing circuit is "1" and the output of said second comparing circuit is "0".

5. The signal processing circuit according to claim 1, wherein said operational circuit is adapted to output "0" only when the output of said first comparing circuit is "0" and the output of said second comparing circuit is "1".

6. The signal processing circuit according to claim 1, wherein said predetermined period is made to be one horizontal scanning period.

7. The signal processing circuit according to claim 1, further comprising a band pass filter for passing a chrominance signal component disposed at the input stage or succeeding stage to said converter or at the preceding stage to said comparing circuits.

8. A signal processing circuit comprising:
a converter for converting a change in the vertical direction of each of amplitude and phase of an input chrominance signal into a change in the direction of amplitude;
a first delay circuit for delaying the output of said converter by a predetermined time period;
a comparing circuit for comparing the amplitude level of the output of said converter with the amplitude level of the output of said first delay circuit;
a second delay circuit for delaying the output of said comparing circuit by the predetermined time period; and
an operational circuit for making an operation with the output of said comparing circuit and the output of said second delay circuit, whereby a vertical correlation of each the amplitude and phase of the chrominance signal is adapted to be detected.

9. The signal processing circuit according to claim 8, wherein said converter comprises a third delay circuit for delaying the input signal by a predetermined time period, and a combining circuit for combining the output of said third delay circuit and said input signal.

10. The signal processing circuit according to claim 8, wherein said comparing circuit comprises first and second detectors for detecting the input signal, and a comparator for comparing output levels of both said first and second detectors.

11. The signal processing circuit according to claim 8, wherein said operational circuit is adapted to output "1" only when the output of said comparing circuit is "1" and the output of said second delay circuit is "0".

12. The signal processing circuit according to claim 8, wherein said operational circuit is adapted to output "0" only when the output of said comparing circuit is "0" and the output of said second delay circuit is "1".

13. The signal processing circuit according to claim 8, wherein said predetermined period is made to be one horizontal scanning period.

14. The signal processing circuit according to claim 8, further comprising a band pass filter for passing a chrominance signal component disposed at the input stage or succeeding stage to said converter or at the preceding stage to said comparing circuit.

* * * * *